E. H. KIRK.
FEED MECHANISM FOR THRESHING MACHINES.
APPLICATION FILED SEPT. 16, 1914.
1,149,526.
Patented Aug. 10, 1915
2 SHEETS—SHEET 1.
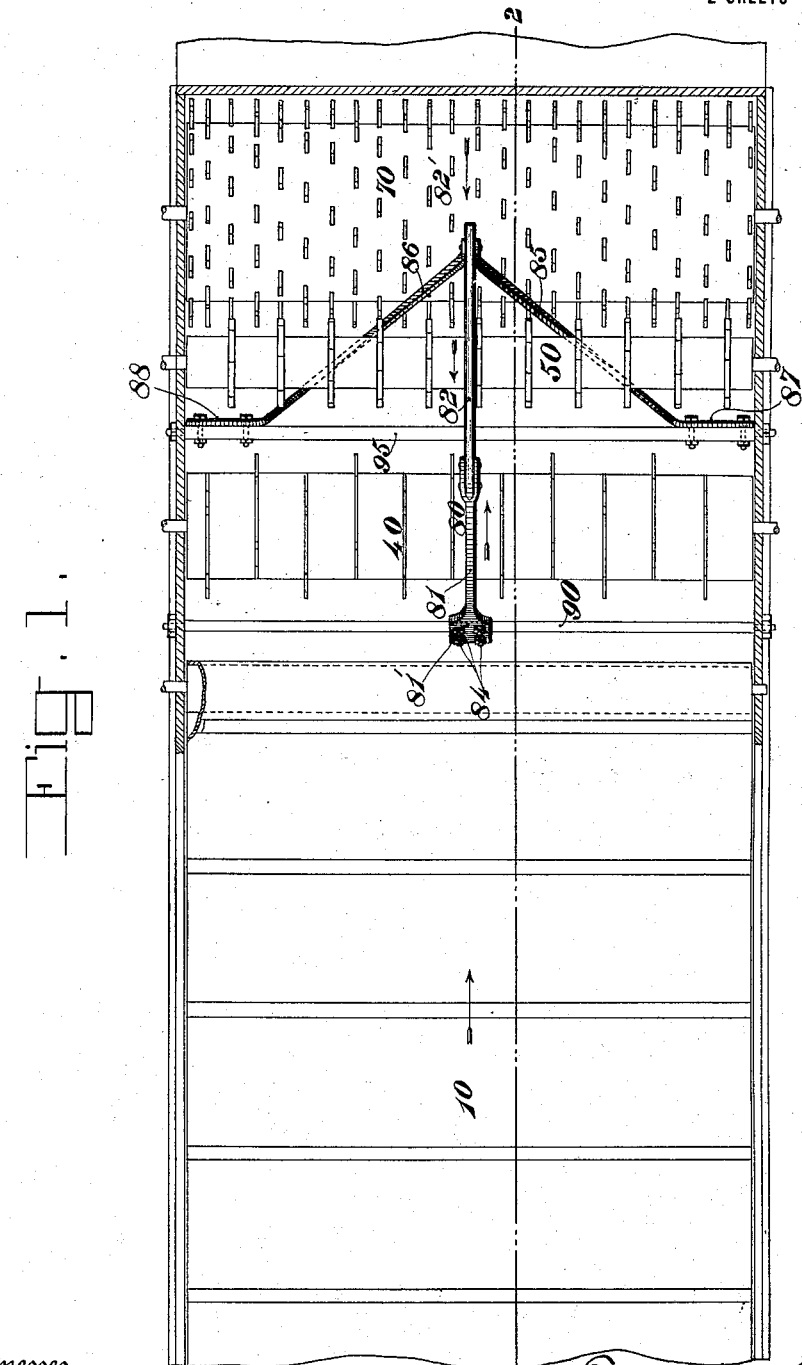

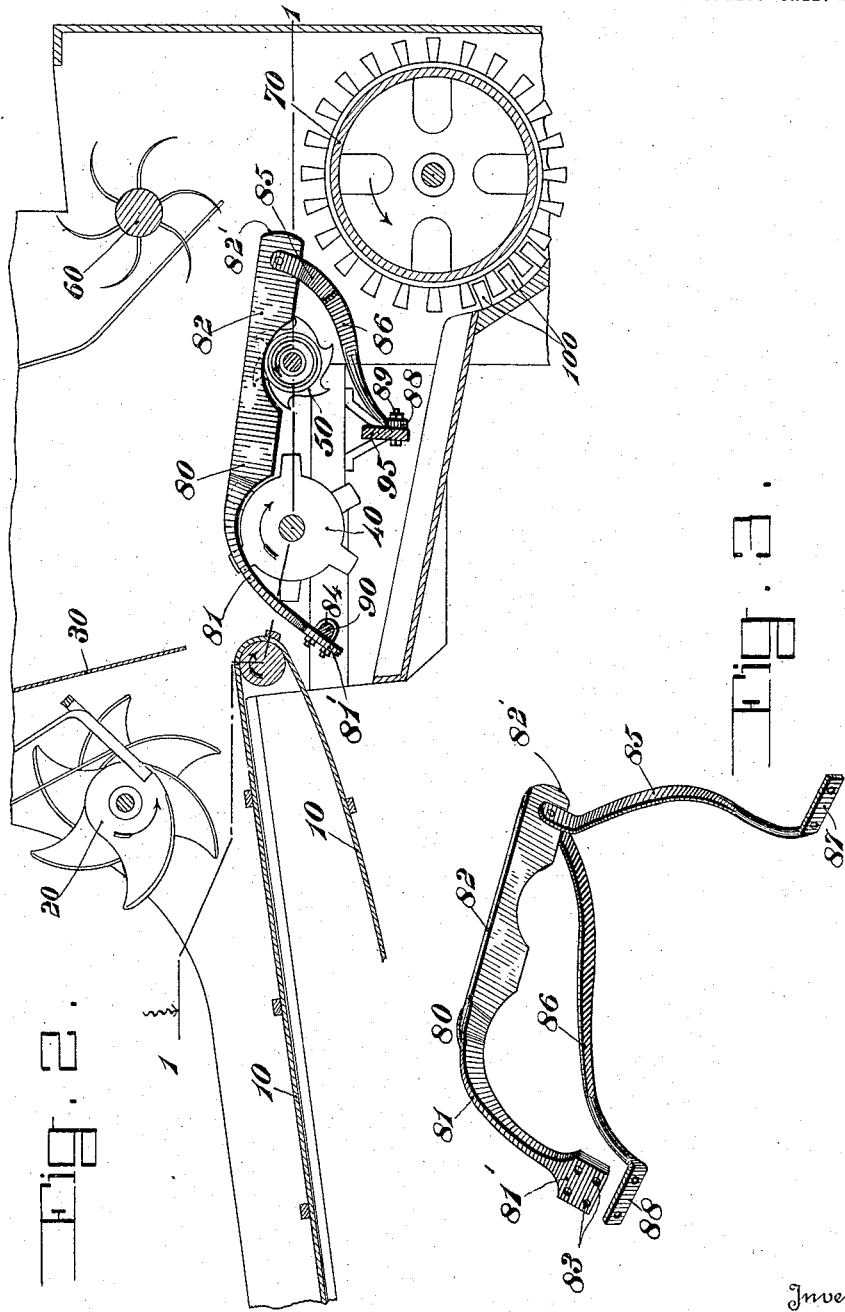

UNITED STATES PATENT OFFICE.

EDWARD H. KIRK, OF BELLE CENTER, OHIO.

FEED MECHANISM FOR THRESHING-MACHINES.

1,149,526.  Specification of Letters Patent.  Patented Aug. 10, 1915.

Application filed September 16, 1914. Serial No. 862,079.

*To all whom it may concern:*

Be it known that I, EDWARD H. KIRK, a citizen of the United States of America, residing at Belle Center, in the county of Logan, in the State of Ohio, have invented certain new and useful Improvements in Feed Mechanisms for Threshing-Machines, whereof the following is a specification.

This invention relates to feed mechanisms for feeding grain in shocks or bundles to the threshing cylinders of threshing machines or grain separators.

The object of this invention is to provide a simple device for swinging into line or breaking up for action of the threshing cylinder the grain of any shocks or bundles erroneously fed in crosswise instead of lengthwise position, whereby choking or "slugging" of the feed mechanism is avoided.

Figure 1 of the accompanying drawings represents a plan view partly in section on line 1—1 of Fig. 2 of the feeding and threshing mechanism of a grain separator or thresher embodying one form of this invention. Fig. 2 represents a vertical section thereof on line 2—2 of Fig. 1. Fig. 3 is a perspective view of this improvement detached from the thresher.

The same reference numbers indicate corresponding parts in the different figures, round numbers designating the principal elements and intermediate numbers subordinate features thereof.

In the illustrated embodiment of this invention the endless feed apron 10, the band cutter 20, the swinging guard 30, the feeding cylinder 40, the retarding cylinder 50, the porcupine cylinder 60 and the threshing cylinder 70 are shown in one form of their known relations.

A fixed shock-tilting bar 80 is disposed lengthwise of the machine over the feeding and retarding cylinders 40 and 50 between the endless feed apron 10 and the threshing cylinder 70. This bar consists of an inclined front portion 81 disposed immediately in rear of the delivery end of the feed apron 10 and curved upward over the feeding cylinder 40 and a straight rear portion 82 bridging over the feeding mechanism, preferably over both the feeding and retarding cylinders 40 and 50, at about the mid-length thereof. This straight portion 82 may come between blades of the cylinder 40 and cylinder 50 and is preferably disposed on a slightly downward incline. The blades of the feeding cylinder 40 may if desired project above the curve 81 of the bar 80 and serve to pull the bundle of grain over said curved bar. This bar 80 is supported in its position by any suitable means. In the form shown the lower end of the front portion 81 is provided with an attaching plate 81' having holes 83. Clips 84 passing through said holes clamp the bar 80 to a cross bar 90 supported in the frame of the machine. Two straddling braces 85 and 86 are bolted at their upper ends to the rear end of bar 80 and provided at their lower ends with attaching plates 87 and 88 whereby they are secured by means of bolts 89 or otherwise to another cross bar 95. The cross bars 90 and 95 may be cross bars already existing in some forms of threshers to which this invention is applicable. The rear end 82' of the bar 80 is in coöperative relation to the threshing cylinder 70.

In the use of a thresher embodying this improvement, the general run of shocks or bundles are fed in the usual manner in endwise position by the apron 10 under the band cutter 20 and swinging guard 30 to the feeding cylinder 40, thence over said cylinder and over the retarding cylinder 50 to the threshing cylinder 70, in the usual manner. It occasionally happens, however, that a bundle or shock of grain by accident or inadvertence is disposed crosswise of the feed apron 10 and in such case, if the thresher be not provided with the bar 80, the bundle stops between the cylinders 40 and 50, wraps around the cylinder 40 and springs the shaft of cylinder 50, causing trouble and failing to be fed through to the threshing cylinder 70. When, however, the machine is provided with the bar 80, such choking or "slugging" of the feed mechanism is avoided. In this case a crosswise bundle on reaching the delivery end of the feed apron 10 is switched into endwise position by the bar 80 or broken up by the joint action of said bar and the cylinders or one of them. A crosswise bundle delivered off the apron 10 comes in contact with the upwardly curved portion 81 of the bar 80 immediately on leaving the apron and is momentarily suspended thereon, or rides up said curved portion, being assisted in such upward movement by the teeth of the feed cylinder 40 when said teeth are allowed to project above said curved portion on opposite sides thereof. Sometimes a cross bundle, being unevenly balanced on said bar 80, will fall over end first to one side thereof onto the teeth of the cylinder 40 and thence be drawn into endwise position and so passed on over the cylinder 50 and fed to the cylinder 70. Sometimes a cross bundle will ride up over the upwardly curved part 80 onto and along the straight part 82 of the bar 80 and fall endwise over one side thereof onto the teeth of the retarding cylinder 50 and be pulled straight thereby and correctly fed to the threshing cylinder 70. Sometimes a cross bundle riding over the incline 81 onto the straight part 82 will continue along said straight part and while in improper position fall over the end 82' thereof onto the cylinder 70. In such case the bundle will encounter the forwardly moving force of the top of the threshing cylinder and be torn to pieces between the teeth of the cylinder 70 and the end 82' of the bar 80 before the grain reaches the first row of stationary concave teeth 100 with which the teeth of the threshing cylinder coöperate.

This device may be applied to threshing machines already in use as well as to new machines to which it is adapted. It prevents choking of the cylinders and acts as a slug absorber or prevents slugging of the threshing cylinder and avoids the loss of grain thrown over by the cylinder in slugging.

I claim as my invention:

1. In a feed mechanism for threshing machines the combination with the feed apron and the feeding and threshing cylinders of a bar disposed between the feed apron and threshing cylinder and curved upward in front of and bridging over the feeding cylinder.

2. In a feed mechanism for threshing machines the combination with the feed apron and the feeding, retarding and threshing cylinders of a bar disposed between the feed apron and threshing cylinder and curved upward in front of and bridging over the feeding and retarding cylinders.

3. In a feed mechanism for threshing machines the combination with the feed apron and the feeding and threshing cylinders of a bar disposed between the feed apron and threshing cylinder, bridging over the feeding cylinder and having its rear end adjacent to the top of the threshing cylinder and in coöperative relation therewith for crushing or breaking crosswise bundles.

4. In a feed mechanism for a threshing machine the combination with the feed apron and the feeding and threshing cylinders of a bar disposed between the feed apron and threshing cylinder and curved upward in front of and bridging over the feeding cylinder and having its rear end adjacent to the top of the threshing cylinder in coöperative relation therewith for crushing or breaking the crosswise bundles.

5. An attachment for a grain separator consisting of a bundle straightener adapted for application to the feed mechanism and comprising a grain tilting bar adapted to bridge over the feeding mechanism and having an upwardly curved front portion adapted to be engaged by the grain and a declining straight portion in rear of said front portion, said bar being provided at its opposite ends with means of attachment to the separator.

EDWARD H. KIRK.

Witnesses:
  GEORGE W. LILES,
  P. M. STEUART.

Copies of this patent may be obtained for five cents each, by addressing the "Commissioner of Patents. Washington, D. C."